US005859433A

United States Patent [19]

Franzen

[11] Patent Number: 5,859,433

[45] Date of Patent: *Jan. 12, 1999

[54] ION TRAP MASS SPECTROMETER WITH VACUUM-EXTERNAL ION GENERATION

[75] Inventor: Jochen Franzen, Bremen, Germany

[73] Assignee: Bruker-Franzen Analytik GmbH, Bremen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 671,854

[22] Filed: Jun. 28, 1996

[30] Foreign Application Priority Data

Jun. 30, 1995 [DE] Germany ........................ 195 23 860.5

[51] Int. Cl.[6] ........................... G01D 59/44; H01J 409/00

[52] U.S. Cl. ........................... 250/292; 250/288; 250/289

[58] Field of Search .................................... 250/281, 288, 250/292, 289

[56] References Cited

U.S. PATENT DOCUMENTS

| | | | |
|---|---|---|---|
| 4,144,451 | 3/1979 | Kambara | 250/289 |
| 4,542,293 | 9/1985 | Fenn et al. | 250/288 |
| 4,740,696 | 4/1988 | Osawa et al. | 250/289 |
| 4,882,484 | 11/1989 | Franzen et al. | 250/292 |
| 5,248,875 | 9/1993 | Douglas et al. | 250/282 |
| 5,268,572 | 12/1993 | Mordehai et al. | 250/289 |
| 5,298,743 | 3/1994 | Kato | 250/289 |
| 5,313,061 | 5/1994 | Drew et al. | 250/296 |
| 5,352,892 | 10/1994 | Mordehai et al. | 250/288 |
| 5,481,107 | 1/1996 | Takada et al. | 250/288 |
| 5,543,619 | 8/1996 | Mullock | 250/289 |
| 5,672,868 | 9/1997 | Mordehai et al. | 250/292 |

FOREIGN PATENT DOCUMENTS

| | | |
|---|---|---|
| 0529885 | 3/1993 | European Pat. Off. . |
| 2180687 | 9/1986 | United Kingdom . |

OTHER PUBLICATIONS

John N. Louris, et al. *Injection of Ions Inot a Quadrupole Ion Trap Mass Spectrometer,* International Journal of Mass Spectrometry and Ions Processes, vol. 88, pp. 97–111.

*Primary Examiner*—Bruce Anderson

[57] ABSTRACT

The invention relates to an RF quadrupole ion trap mass spectrometer with ionization of the substance molecules outside the vacuum system.

The invention consists of using only a single high-vacuum pump for generating the vacuum without any differential pump stages and generating the necessary pressure stages for operating the mass spectrometer by means of a sequence of openings with adjusted conductances. The necessarily very small inlet opening to the vacuum system is only able to transport very small quantities of ions of the analyzed substances in the gas stream. However, these quantities are adequate for operating the mass spectrometer because the ion trap used as mass spectrometer is capable of collecting and storing ions over relatively long periods of time.

10 Claims, 1 Drawing Sheet

ION TRAP MASS SPECTROMETER WITH VACUUM-EXTERNAL ION GENERATION

The invention relates to an RF quadrupole ion trap mass spectrometer with ion of the substance molecules outside the vacuum system.

The invention consists of using only a single high-vacuum pump for generating the vacuum without any differential pump stages and generating the necessary pressure stages for operating the mass spectrometer by means of a sequence of openings with adjusted conductances. The necessarily very small inlet opening to the vacuum system is only able to transport very small quantities of ions of the analyzed substances in the gas stream. However, these quantities are adequate for operating the mass spectrometer because the ion trap used as mass spectrometer is capable of collecting and storing ions over relatively long periods of time.

PRIOR ART

The generation of ions for mass spectrometric analysis within the vacuum system has the disadvantage that a large excess of substance molecules has to be introduced into the vacuum system because the yield of ions produced by in-vacuum ionization methods is generally very small. This entails the risk of contamination of the vacuum system by condensation of substance molecules on the walls. Therefore the trend is increasingly towards generating the ions outside the vacuum system of mass spectrometers and transporting them into the vacuum system by suitable methods.

Such vacuum-external ion sources include, for example, electrospray ionization (ESI), with which substances of exceptionally high molecular weights can be ionized. Electrospraying is frequently coupled with modem separation methods, such as liquid chromatography or capillary electrophoresis. The generation of ions by ionization with inductively coupled plasma (ICP), which are needed for inorganic analysis, also belongs to this group of vacuum-external ion production. Finally, there is atmospheric pressure chemical ionization (APCI) with a primary ionization of the reactant gases by means of corona discharges or beta emitters with low energy of the emitted electrons. APCI is used, amongst other things, for the analysis of pollutants in the air and, in addition, is particularly suitable for coupling mass spectrometry with gas chromatography. Other types of vacuum-external ion sources, such as Grimm's hollow cathode glow discharges and others, are still being investigated and developed.

According to prior customary practice, the ions from these ion sources are admitted into the vacuum of the mass spectrometer together with large quantities of ambient gas. For this purpose, small openings with diameters of approximately 30 to 300 micrometers, or 10 to 20 centimeter long capillaries with internal diameters of approximately 500 micrometers are used. The excess gas must be removed by means of differentially operating pump stages; in the case of commercially available mass spectrometers, two or even three differential high-vacuum pump stages are used with a corresponding number of pump-connected chambers in front of the main chamber of the mass spectrometer. Including the roughing stages, three to four (or even five) vacuum pumps are therefore used with one mass spectrometer.

The successive vacuum chambers are only connected by very small openings and the ions must be passed through these small openings from chamber to chamber. The pressure in the first differential pump chamber of commercially available mass spectrometers is usually a few millibars, in the second differential pump chamber it is approximately $10^{-3}$ to $10^{-4}$ millibar, if only two differential pump chambers are used, and a level of $10^{-6}$ to $10^{4}$ millibar is maintained in the main vacuum chamber. The mass spectrometer is located in the main vacuum chamber. The ions have to be passed through the differential pump chambers and the small openings between the chambers, during which process large ion losses occur.

To transfer the ions through these chambers, RF multipole ion guides are often used, but these are only suitable at pressures below several $10^{-2}$ millibars, as otherwise electrical discharges occur. The ion guides can therefore only be used in the second differential pump chamber or in the main vacuum chamber. They are used to advantage in a pressure range of some $10^{-3}$ millibars, since they then rapidly damp the radial oscillations and also the longitudinal movements of the ions, thereby providing good conditions for further transport of the ions and for analysis of the ions in the mass spectrometer.

As is already apparent from this description, the differentially operating pump stages used up to now are disadvantageous. They make it more difficult to transfer the ions to the mass spectrometer, make operation of the mass spectrometer complex and require the use of several costly, large fore-pumps and high vacuum pumps.

In the following pages the examination is restricted to mass spectrometers using quadrupole RF ion traps invented by Wolfgang Paul. These offer the advantage of extremely high sensitivity and the possibility of temporal tandem mass spectrometry (MS/MS or $MS^n$) for scanning daughter ion spectra or granddaughter spectra of selected, fragmented parent ions. The main goal of this invention is the operation of a mass spectrometer with only a single high vacuum pump. The ion trap mass spectrometers, referred to below as "ion traps" for short, offer four decisive advantages for this purpose. Firstly, they function optimally when operated with a collision gas pressure between $10^{-4}$ and $10^{-2}$ millibar in their interior. This is helpful for operation with only a single high vacuum pump. Secondly, these mass spectrometers require only very small ion currents, since they are able to collect the ions over long periods of time, if necessary many minutes, and do allow the mass spectrometric analysis of the ions to wait up to time when the mass spectrometer has been filled with a sufficient number of ions. Thirdly, they use all of the ions collected, in contrast of most other types of mass spectrometers which operate as filters an throw away most of the ions. Finally, they are exceptionally fast in analysis operation, so that spectrum scanning takes only approximately 20 milliseconds.

The ion traps essentially consist of a rotation-hyperbolically shaped ring electrode and two rotation hyperbolic end cap electrodes. Usually the ring electrode is supplied with the necessary RF voltage for generating the quadrupolar RF field, whilst the end cap electrodes are kept near to ground potential. The RF voltage is also frequently referred to as "drive voltage" of the ion trap. The ions are held and stored in quasi-harmonic retroactive force fields by the effect of the quadrupolar RF field. Their quasi-harmonic ("secular") oscillation can be damped by a collision gas, and the ions then collect in a cloud in the center of the ion trap.

Well-formed ion traps can store ions for a very long time. If the ions do not decompose, they can remain stored for many hours without any losses. This makes it possible for ions to be collected over a period of many hundreds of milliseconds, or even many seconds or minutes, and only then examined by mass spectrometry.

At the end cap electrodes an RF voltage can be applied, which has a lower frequency and a much smaller voltage compared to the driving voltage. With this "excitation RF voltage" the ions, whose secular oscillation in the axial direction of the ion trap conforms with the excitation frequency, can be resonantly excited to produce oscillations, and, if so wanted, they can be ejected from the ion trap through ion ejection holes in one of the end caps. The ions can then be measured as an ion current outside the ion trap using an ion detector. Since the secular oscillation of the ions is unambiguously dependent on their mass-to-charge ratio, mass spectra can be scanned with this method. Such a mass-selective ejection of ions can be improved in many different ways, for example by making use of non-linear resonances generated by the addition of higher multipole fields, or by superimposing additional quadrupole fields with other frequencies.

Dipolar excitation of the ion oscillations can be used in the way already known for isolating individual ion types and for collisionally induced fragmentation. In this way it is possible to scan daughter spectra of selected parent ions.

In general, the end cap electrodes are adjusted and fixed very precisely in relation to the ring electrode, usually using insulating spacers. If rings made of glass, ceramic or plastic are used for this purpose, ion traps are produced in the form of sealed chambers whose only connection with the surrounding vacuum is via the ion inlet holes and ion ejection holes.

OBJECTION OF THE INVENTION

The objective of the invention is to find a device with which ions from a vacuum-external ion source can be measured and analyzed with an ion trap mass spectrometer, without using more than one high vacuum pump for the mass spectrometer. It would be advantageous, though not necessary, to have temporary storage of the ions in the vacuum section of the mass spectrometer in order to also collect ions during the periods when the ions are being analyzed in the ion trap.

IDEA OF THE INVENTION

For all sensitive mass spectrometers, electron multipliers are used exclusively as detectors, and these detectors are the most pressure-critical devices of the whole spectrometer. It is therefore the basic idea of the invention to make the gas stream which guides the ions into the vacuum system so small that the high vacuum pump used is adequate for generating the necessary high vacuum in the region of the detector. For this purpose, the ion detector is best installed directly in front of the high vacuum pump.

For modern secondary electron multipliers, a working pressure of $10^{-5}$ millibar is sufficient, and for some multipliers even a still poorer vacuum of up to $10^{-4}$ millibar will do. If one uses a small turbomolecular pump with a suction capacity of only 70 liters per second, a gas inflow of 0.7 microliters per second, i.e. approx. 40 microliters (or cubic millimeters) per minute, can be tolerated for maintaining a vacuum pressure of $10^{-5}$ in front of the pump port. Such high vacuum pumps with suction capacities of 70 liters per second are supplied as standard by several companies. They are each equipped with a drag stage and can be operated with simple diaphragm fore-pumps. This combination provides a very economical and space-saving solution for vacuum generation for the small mass spectrometer.

However, this high vacuum pump with 70 liters per second is only intended as particularly favorable example.

For an ion getter pump with a suction capacity of 20 liters per second, an only slightly less favorable case can be constructed. Even with a tiny ion getter pump with only 2 liters per second, an interesting mass spectrometer for pollutant analysis can be designed. Nevertheless, in the following pages the mass spectrometer with the pump for 70 liters per second will be considered primarily.

To be able to transport the largest possible number of ions in the small gas stream of 0.7 cubic millimeters per second, the gas velocity during inflow into the vacuum system must be made as high as possible. Only then will the space-charge limitations in the gas flow be small. So it is important to find an easy-to-handle and easy-to-manufacture inlet nozzle with favorable characteristics, with which the ions can be transferred into the vacuum.

It is therefore a further basic idea of the invention to use commercially available capillaries for this inflow, which are, however, kept extremely short.

As an example, a commercially available glass capillary with a diameter of 10 micrometers, which is shortened to a length of one millimeter, generates a gas flow of 0.64 cubic millimeters of normal air into the vacuum. A gas velocity in the inlet area of the inlet capillary of approx. 13 meters per second is generated, whilst on the vacuum side the velocity in the capillary is very much higher. If one assumes that (a) the ions fly into the inlet capillary at intervals of 2 micrometers, (b) approx. 10,000 ions per filling are needed, and (c) the ion trap really traps only 5% of the ions introduced, the ion trap can be filled in 40 milliseconds under these conditions. The plasmas required for this purpose with a density of 5,000,000 ions per cubic millimeter (corresponding to 10 attomol of ionized substance in 30 nanomol of air, or a concentration of 0.3 ppbm), can certainly be manufactured if the plasma contains positive and negative particles simultaneously. Since one needs only 20 milliseconds for the analysis, approximately 14 spectra per second can be scanned on the basis of these assumptions.

If the space between the ions flying into the inlet area of the capillary is larger, e.g. only one ion every 10 micrometers, this is still sufficient for four to five spectra per second.

Commercially available metal capillaries with very small capillary diameters can also be used in this way.

However, the invention is not necessarily restricted to short capillaries. Very narrow orifice nozzles manufactured, for example, by electron-beam drilling or laser drilling can be used for this purpose. Short orifice nozzles have a still higher inflow velocity and can, when viewed superficially, guide more ions into the vacuum. However, this no longer applies if the Debye length of the ionized plasma that is to be guided into the vacuum is significantly smaller than the orifice diameter. Therefore, in all probability, there is an optimum ratio between diameter and length of the inlet opening, which must be determined experimentally.

On the other hand, orifice nozzles are more liable to become blocked by minute dust particles.

Since it is not yet known which shape of inlet nozzle provides optimum use of the ion inflow, the term "capillary inlet openings" used in the following pages is intended to also include fine orifice nozzles.

The ion trap must only be filled with ions during the filling period. In the analysis phase of the ions, e.g. during the spectrum scanning phase, filling must not take place. However, it is difficult to ensure that ion transport in front of or in the capillary nozzle is restricted to the filling period of the ion trap. It is far easier to allow ion transport into the vacuum to take place continuously and to switch the ion beam only where and when the ions enter the ion trap. For this purpose a switching element is required which can hinder the ions at the inlet of the ion trap in spite of the high velocity which keeps the ions in the outflowing gas.

It is therefore a further basic idea of the invention to store the ions temporarily in the vacuum, but before they enter the ion trap, and when so doing to thermalize them and only introduce them into the ion trap during the filling period. Intermediate storage is achieved simply with an RF ion guide in which the ions can easily be stored by means of ion reflectors installed on both sides. In the ion guide, ions are thermalized when the ion guide is in an area of favorable pressure between $10^{-2}$ and $10^{-3}$ millibar. Thermalization increases the trapping likelihood in the ion trap, and makes entry into the ion trap more easily switchable.

Filling the trap with ions from the ion guide can be achieved by raising the mid-potential of the RF ion guide above the potential of the end cap of the quadrupole ion trap for the duration of the filling period, so that the ions can flow off into the quadrupole ion trap. However, the ion trap can also be filled, without changing the mid-potential of the RF voltage of the ion guide, by means of a switchable drawing lens located between ion guide and ion trap.

Filling from the ion guide takes approximately 20 milliseconds. Together with a further 20 milliseconds analysis time, this gives a scanning rate of 25 spectra per second. This high scanning rate naturally presupposes a sufficiently high ion density outside the vacuum so that sufficient ions for a spectrum scan can be introduced into the ion guide in 40 milliseconds and stored, as already discussed above.

Such a high scanning rate for the spectra is, however, often unnecessary. Even for ionization methods which deliver lower ion densities, such a low-cost mass spectrometer is quite useful.

For scanning daughter ion spectra, approximately 80 milliseconds are needed, which produces approximately 10 daughter ion spectra per second. Here the collecting time of the ions in the ion guide is longer. This can be used favorably for overfilling the ion trap before isolating the parent ions, which produces daughter ion spectra with a significantly better signal-to-noise ratio.

Furthermore, collection of ions in the ion guide can be used to separate out undesirable ions below a threshold for the mass-to-charge ratio, for example the reactant gas ions of an APCI ionization. For this purpose the ion guide is operated with an RF voltage in such a way that these ions are not stored stably and therefore escape from the ion guide.

For operating the ion guide and ion trap, vacuum pressures far above the operating pressure of the secondary electron multiplier are necessary. Therefore, pressure stages must be introduced which achieve the optimum operating pressures. Favorable collision gas pressures in the ion trap and ion guide are between $10^{-4}$ and $10^{-2}$ millibar. If air is used as the collision gas, the optimum collision gas pressure in the ion trap is between $4\times10^{-4}$ and $8\times10^{-4}$ millibar, and in the antechamber with the ion guide it is approx. $5\times10^{-3}$ millibar. This pressure of $5\times10^{-3}$ millibar can be maintained by a single ion entrance hole in the ion trap end cap with 1.4 millimeter diameter. With 7 holes of 1,4 millimeter diameter as ion exit holes, a pressure of $6\times10^{-4}$ millibar is maintained inside the ion trap, under the above flow conditions of 0.7 microliters per second. If helium is used by the optimum pressures should be higher by approximately a factor of 6. It is therefore a further basic idea of the invention to design the ion traps as sealed chambers, to guide the gas stream from the capillary inlet opening to the pump entirely through the ion trap, and to design the dimensions of the ion inlet opening (if present) and the ion ejection opening(s) such that optimum pressure conditions are created.

PARTICULARLY FAVORABLE EMBODIMENTS

Figure 1:
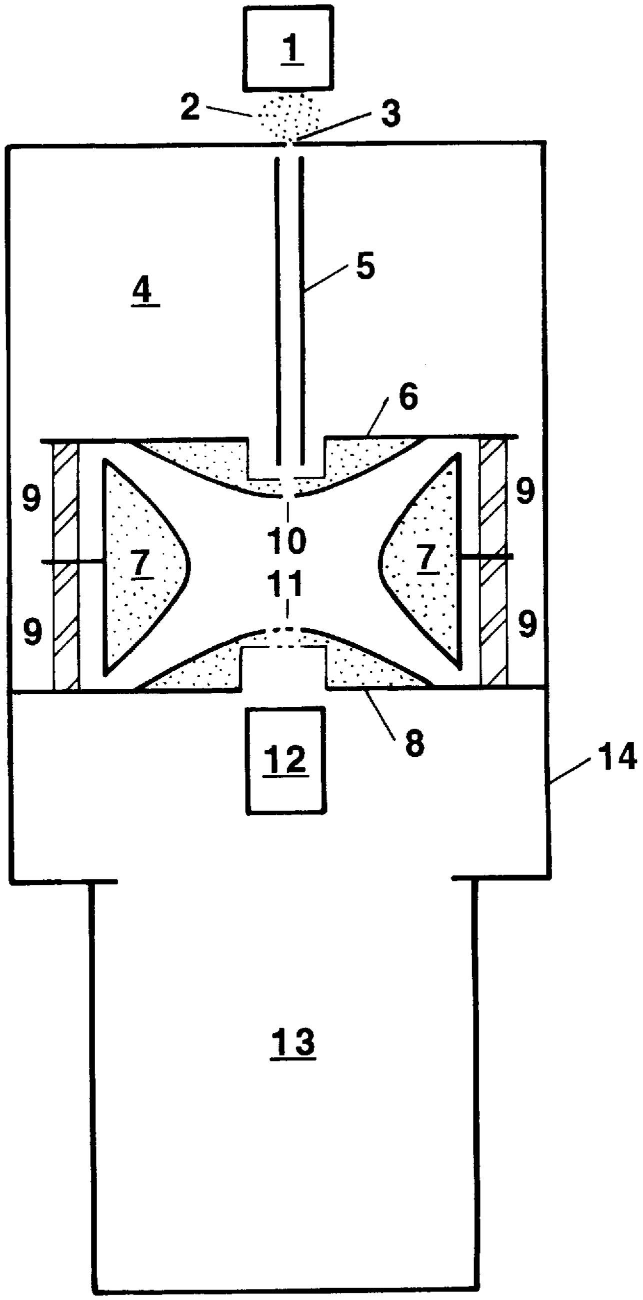
FIG. 1 shows a mass spectrometer according to this invention. The vacuum-external ion source 1 generates a cloud 2 of ions in front of the capillary inlet opening 3 in the wall 14 of the vacuum system. A gas stream through the capillary inlet opening 3 brings ions from the cloud 2 into the antechamber 4 of the vacuum system. In the antechamber 4 there is the ion guide 5, which stores and thermalizes the ions accelerated in the gas stream. Ions from the ion guide 5 are filled into the ion trap, which consists of the end caps 6 and 8 and the ring 7. The ion inlet opening 10 is located in the end cap 6, and the ion ejection openings 11 are located in the end cap 8. The two end caps 6 and 8 and the ring electrode 7 are adjusted in relation to each other and fixed via two glass rings 9. The end cap 8 separates the antechamber 4 from the chamber in which the ion detector 12 is located in front of the high vacuum pump 14.

The particularly favorable embodiment which is described here and shown in FIG. 1 operates according to the invention with a vacuum-external ion source 1 and an RF quadrupole ion trap consisting of two end cap electrodes 6 and 8 and a ring electrode 7, which takes the form of a mass spectrometer and has only a single high vacuum pump 13, according to the invention. A "turbo-drag" pump with 70 liters per second suction capacity and 65 millimeter flange diameter may be used, for which a fore-vacuum of approx. 20 millibars is sufficient. The latter can be operated at very low cost by means of a four stage diaphragm fore-pump which weighs less than 800 grams. As a special feature, the mass spectrometer contains an ion guide 5, which serves to thermalize and temporarily store the ions which have been entrained and accelerated in the gas stream of the capillary inlet opening 3. The inlet capillary dimensions for the optimum flow of 0.7 microliters per second, and the optimum aperture diameters for the inlet and exit holes in the ion trap end caps are given above.

This mass spectrometer can be used for many purposes, for example as a very low-cost mass spectrometric detector for gas chromatography with the ability to confirm doubtful identifications by scanning daughter ion spectra of selected parent ions with the aid of various methods which are well known from the literature.

Using electrospray methods for ionization, this mass spectroscopic detector can also be utilized for liquid chromatography or electrophoresis.

Quadrupole systems, hexapole systems or systems with an even larger number of poles can be used as RF ion guide 5. Pentapole systems are also possible, whose operation requires a five-pole rotational RF voltage, as described in patent application BFA 20/95. Systems with a larger uneven number of rotational poles can also be used.

By changing the potential on the axis or at the center of the ion guide 5 in relation to the potentials of the wall pf the vacuum chamber 4 of end cap 6, the ion guide 5 can be used to store ions of a single polarity, i.e. either positive or negative ions. The potential on the axis is identical to the zero potential of the RF voltage on the RF ion guide. The stored ions constantly run back and forth in the ion guide 5. Since they attain a speed of approx. 500 to 1,000 meters per second in the adiabatic acceleration phase of gas expansion, they initially run through the length of the ion guide several times per millisecond. Their radial oscillation in the ion guide depends on the angle of injection.

Another extreme of a favorable embodiment consists of a tiny mass spectrometer which works with a very small ion trap with a ring radius of only 0.5 centimeters and is evacuated by a tiny ion getter pump with a diameter of 2 centimeters and a suction capacity of 2 liters per second. The complete spectrometer—without the electronics—is only 2.5 centimeters in diameter and 15 centimeters long. The ions are admitted direct into the ion trap via a capillary 6 micrometers in diameter and 4 millimeters long. This gas inlet produces a particularly good trapping efficiency of approx. 25% of the ions. At the multiplier there is a pressure of $10^{-5}$ millibar. The 7 exit holes in the end cap should have diameters of 0.5 millimeter each, resulting in an ion trap pressure of $3\times10^{-4}$ millibar. In the input area of the capillary the gas velocity is approx. 1 meter per second. With an ion spacing of 10 micrometers and an optimum filing rate for the ion trap of 5,000 ions, 4 spectra per second can be scanned in favorable cases. Ionization is produced by means of a $^{63}Ni$ beta emitter.in a dustfree room in front of the inlet capillary. This beta emitter is connected to the outside air via a very thin silicone membrane, keeping the dust out. Pollution vapors penetrate the silicone membrane into the dust-free room. The ion feed can be interrupted by means of a tiny mechanical closure of the capillary inlet, e.g. by pneumatically moving the above-mentioned silicone membrane. This allows an extremely small mass spectrometer to be constructed for continuous air monitoring. Even if the scanning rate of 4 mass spectra per second cannot be achieved and, for example, a spectrum is only scanned every 10 seconds, such a mass spectrometer would still be of great interest.

This mass spectrometer is also capable of scanning daughter ion spectra. This is achieved in a particularly easy manner as follows. By means of a partial scan, only those ions with masses below that of the selected parent ions are removed and then these parent ions are fragmented into daughter ions. The latter are scanned as the spectrum. In this way it is even possible to examine several different parent ion types with increasing masses in sequence without needing to refill the ion trap. This possibility of identifying substances in mixtures means that the apparatus can also be used for monitoring purposes without chromatographic separation, even if several components in a single mixture have to be analyzed.

I claim:

1. Ion trap mass spectrometer comprising:

(a) an RF quadrupole ion trap with ion injection and ejection openings, (b) an ion detector outside the ion trap for measuring ions ejected from the ion trap through the ejection opening, (c) a vacuum system which encompasses the ion trap and ion detector, the vacuum system comprising a plurality of interconnected vacuum chambers including a first chamber containing the ion trap and a second chamber containing the ion detector, (d) an ion source outside the vacuum system, and (e) a capillary inlet opening in the wall of the vacuum system for admitting a gas stream, with which the ions are transported into the vacuum system, and wherein (f) the vacuum within the vacuum system is generated by only a single high vacuum pump, the vacuum pump having a suction capacity of less than 100 liters per second, and the only gas intake of the vacuum system is through the capillary inlet opening, (g) the ion detector is installed near the port of the high vacuum pump, and (h) the capillary inlet opening, and openings between the chambers of the vacuum system are dimensioned so that a vacuum in the second chamber is maintained at or below $10^{-4}$ millibar, and a vacuum in the first chamber is significantly different than that of the second chamber, and maintained above $10^{-4}$ millibar.

2. Device as in claim 1, wherein the gas stream from the capillary inlet opening to the high vacuum pump is essentially guided through the ion trap and leaves the ion trap through the ion ejection openings, and the dimensions of the ion ejection openings generate the collision gas pressure needed for operating the ion trap.

3. Device as in claim 1, wherein the capillary inlet opening issues direct into the ion trap.

4. Device as in claim 1, wherein the capillary inlet opening issues into an RF ion guide, which is located in an antechamber in front of the ion trap and which guides the ions from the capillary inlet opening to an ion inlet opening in the ion trap.

5. Device as in claim 4, wherein the RF ion guide takes the form of an ion store by means of reflecting potentials at one end at least.

6. Device as in claim 4, wherein the dimensions of the ion inlet opening and the openings between the chambers of the ion trap a pressure in the antechamber of between $10^{-4}$ and $10^{-2}$ millibar.

7. Device as in claim 1, wherein the capillary inlet opening comprises a short capillary tube which is sealed into the wall of the vacuum system.

8. Device as in claim 7, wherein the capillary tube comprises metal.

9. Device as in claim 7, wherein the capillary tube comprises glass or silica glass.

10. Device as in claim 7, wherein the capillary tube is conductive with a high resistivity at least on its internal surface.

* * * * *